US009111287B2

(12) United States Patent
Liu et al.

(10) Patent No.: US 9,111,287 B2
(45) Date of Patent: Aug. 18, 2015

(54) VIDEO CONTENT-AWARE ADVERTISEMENT PLACEMENT

(75) Inventors: Xu Liu, Beijing (CN); Ying Shan, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 591 days.

(21) Appl. No.: 12/633,609

(22) Filed: Dec. 8, 2009

(65) Prior Publication Data

US 2011/0078623 A1  Mar. 31, 2011

Related U.S. Application Data

(60) Provisional application No. 61/247,375, filed on Sep. 30, 2009.

(51) Int. Cl.
*G06F 3/048* (2013.01)
*G06Q 30/02* (2012.01)

(52) U.S. Cl.
CPC .................................. *G06Q 30/02* (2013.01)

(58) Field of Classification Search
USPC ........... 386/239, 278; 705/14.4, 14.49, 14.72, 705/14.73; 715/716, 719, 723
See application file for complete search history.

(56) References Cited

U.S. PATENT DOCUMENTS

| | | | |
|---|---|---|---|
| 6,424,370 B1 * | 7/2002 | Courtney | 348/143 |
| 6,724,915 B1 * | 4/2004 | Toklu et al. | 382/103 |
| 6,774,908 B2 | 8/2004 | Bates | |
| 7,116,342 B2 * | 10/2006 | Dengler et al. | 345/630 |
| 7,158,666 B2 * | 1/2007 | Deshpande et al. | 382/162 |
| 7,248,300 B1 * | 7/2007 | Ono | 348/333.03 |
| 7,456,874 B1 * | 11/2008 | Ono | 348/239 |

(Continued)

FOREIGN PATENT DOCUMENTS

| | | |
|---|---|---|
| JP | 2002-032590 | 1/2002 |
| JP | 2003-242410 | 8/2003 |

(Continued)

OTHER PUBLICATIONS

PCT International Search Report, International Application No. PCT/US2010/047198 mailed Apr. 21, 2011, 8 pages.

(Continued)

*Primary Examiner* — Rashawn Tillery
(74) *Attorney, Agent, or Firm* — Joann Dewey; Jim Ross; Micky Minhas (57) ABSTRACT

Computer-readable media and computerized methods for utilizing an awareness of video content within a media file to incorporate an advertisement therein are provided. Building the video-content awareness involves performing an offline authoring process to generate a trajectory. In particular, the offline authoring process includes targeting an object appearing in the video content, tracking movement of the object over a sequence of frames within the media file, and, based on the tracked movement, writing locations of the object to the trajectory. In an online rendering process, invoked upon initiating play of the media file, the advertisement is automatically selected and dynamically placed on top of the video content as a function of the locations within the trajectory. Accordingly, by repositioning the advertisement (typically an animation) within the video content based on the movement of the object, an illusion that the advertisement visually interacts with the object is generated.

20 Claims, 8 Drawing Sheets

(56) References Cited

U.S. PATENT DOCUMENTS

| | | | |
|---|---|---|---|
| 7,979,877 B2* | 7/2011 | Huber et al. ............... | 725/36 |
| 2002/0023094 A1 | 2/2002 | Takenori et al. | |
| 2002/0112249 A1 | 8/2002 | Hendricks et al. | |
| 2003/0158780 A1 | 8/2003 | Isobe et al. | |
| 2004/0068547 A1 | 4/2004 | Kang | |
| 2004/0100556 A1* | 5/2004 | Stromme ............... | 348/157 |
| 2004/0116183 A1 | 6/2004 | Prindle | |
| 2006/0078047 A1* | 4/2006 | Shu et al. ............ | 375/240.01 |
| 2006/0126719 A1 | 6/2006 | Wilensky | |
| 2008/0046920 A1 | 2/2008 | Bill | |
| 2008/0195468 A1* | 8/2008 | Malik ..................... | 705/14 |
| 2008/0295129 A1 | 11/2008 | Laut | |
| 2009/0022473 A1 | 1/2009 | Cope et al. | |
| 2009/0171787 A1 | 7/2009 | Mei | |
| 2009/0175538 A1 | 7/2009 | Bronstein | |
| 2009/0227378 A1* | 9/2009 | Rom et al. ............... | 463/42 |
| 2009/0307722 A1* | 12/2009 | Gross ..................... | 725/34 |
| 2010/0070996 A1* | 3/2010 | Liao et al. ............... | 725/35 |

FOREIGN PATENT DOCUMENTS

| | | | |
|---|---|---|---|
| JP | 2004-516589 | | 6/2004 |
| JP | 2008-077173 | | 4/2008 |
| JP | 2008146492 | A | 6/2008 |
| JP | 2009-094980 | | 4/2009 |
| KR | 20090044221 | A | 5/2009 |
| TW | 454158 | B | 9/2001 |

OTHER PUBLICATIONS

Xu, Changsheng, et al., "Sports Video Analysis: Semantics Extraction, Editorial Content Creation and Adaptation", Published Date: Apr. 2009, National Lab of Pattern Recognition, Beijing, China, http://www.academypublisher.com/jmm/vol04/no02/jmm04026979.pdf.

Han, Fred, "Google Certifies Tumri's Ad Platform for Context-Aware Ads", Published Date: Jan. 6, 2009 http://www.reuters.com/article/pressRelease/idUS131693+06-Jan-2009+BW20090106.

Brunheroto, J., et al., "Issues in Data Embedding and Synchronization for Digital Television", Published Date: 2000, IBM Research, Hawthorne, NY, http://ieeexplore.ieee.org//stamp/stamp.jsp?tp=&arnumber=00870990.

V4x Interactive Media Platform—Retrieved Date: Aug. 11, 2009, http://www.v4x.com/docs/brochure.pdf.

"Third Office Action and Search Report Issued in Chinese Patent Application No. 201080044011.X", Mailed Date: May 9, 2014, 14 Pages.

"Office Action Issued in Taiwan Patent Application No. 99127767", Mailed Date: Feb. 26, 2015, 14 Pages.

European Search Report dated Apr. 16, 2015 in Application No. 10820993.3, 5 pages.

* cited by examiner

VIDEO CONTENT-AWARE ADVERTISEMENT PLACEMENT

CROSS-REFERENCE TO RELATED APPLICATIONS

This nonprovisional patent application claims the benefit of U.S. Provisional Application No. 61/247,375, filed Sep. 30, 2009, entitled "VIDEO CONTENT-AWARE ADVERTISEMENT PLACEMENT."

STATEMENT REGARDING FEDERALLY SPONSORED RESEARCH OR DEVELOPMENT

Not applicable.

BACKGROUND

In data-searching systems preceding the Web, and on the Web since its inception, search engines have employed a variety of tools to aid in organizing and presenting advertisements in tandem with search results and other online content, such as digital images and streaming video. These tools are also leveraged to optimize the revenue received by the search engine, where optimizing revenue may be facilitated by selecting advertisements that are relevant to a user and by placing the selected advertisements in a noticeable location. In addition, companies that advertise strive to develop advertisements that are attention-capturing, frequently selected by the search engines for display, and, upon being displayed, readily perceived by users of those search engines. If these three objectives are achieved, a company is likely to be successful in selling a particular item or a particular service. For instance, an eye-catching advertisement placed in a top-center banner position on a web page will likely receive more attention from a user and, thus, likely generate more revenue for the search engine and the company, as opposed to a bland advertisement positioned in a lower portion of the web page. That is, because the advertisement is noticed by the user, the likelihood that the user will take action (e.g., visit a website of the advertiser) based on the advertisement is increased.

However, when presenting advertisements by employing the conventional techniques above, the number of advertisements that could be potentially displayed in a particular web page is unduly limited. That is, search engines have not leveraged all available portions of the web page and have been ineffective in optimizing advertising revenue from the companies that advertise. For instance, large regions of a display area within the web page may be occupied by digital videos or other animated graphics. However, because digital videos display moving objects and other active visual stimulus, search engines as well as companies that advertise are reluctant to place advertisements on top of the videos based on fears that the advertisement will not be noticed, or worse, create an unwelcome distraction.

Accordingly, employing a process to track movement of objects within digital videos and to use the tracked movement to develop and place advertisements within the digital videos, such that the advertisements would appear to visually interact within the objects, would increase the number of opportunities to place an advertisement within a particular web page and would increase the likelihood the user would notice the placed advertisements, thereby increasing the likelihood that the user will take action based on the advertisements.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention generally relate to computer-readable media and computerized methods for identifying and tracking an object within video content of a media file (e.g., digital video) such that an awareness of characteristics of the video content is developed. This awareness can then be used for manipulating how and when an advertisement is overlaid on the video content. For instance, the advertisement may be manipulated to interact within the identified object.

The step of developing the awareness of video-content characteristics is carried out by an offline authoring process. This offline authoring process is implemented to identify an object within the video content with which an advertisement will visually interact. Next, the identified object is tracked. Tracking may include the steps of targeting a patch within the object appearing in the video content of the media file and tracking the movement of the patch over a sequence of frames within the media file. As more fully discussed below, a "patch" generally refers to a prominent set of pixels within the object that exhibits an identifiable texture (e.g., an eye of a person or animal). Based on the tracked movement of the patch, locations of the patch within the sequence of frames are written to a trajectory. In an exemplary embodiment, a trajectory includes a list of patch locations, configured as X and Y coordinates, that are each associated with a particular frame in the sequence of frames.

Next, the step of manipulating how and when an advertisement is overlaid on the video content is performed by the online rendering process. Initially, the online rendering process is carried out upon initiating play of the media file. Accordingly, several steps are typically performed before the online rendering process is invoked, such as receiving a plurality of advertisements that are each designed with consideration of the trajectory and choosing one of the received advertisements for rendering based on a selection scheme (e.g., revenue optimizing, rotational, and the like). Upon choosing an advertisement and receiving an indication (e.g., user-initiated selection of a representation of the media file on a web page) to invoke the online rendering process, the online rendering process conducts the following procedures: generating an ad-overlay that accommodates a container to hold the video advertisement; positioning the container within the ad-overlay according to the trajectory; and inserting the chosen advertisement into the container. Accordingly, the ad-overlay is rendered on top of the video content when playing the media file such that the advertisement appears to visually interact with the object or other video content.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Accordingly, in one embodiment, the present invention relates to computer-executable instructions, embodied on one or more computer-readable media, that perform a method for dynamically placing an advertisement on top of video content in a media file, based on movement of an object therein. Initially, the method involves performing an offline authoring process for generating a trajectory. Typically, the offline authoring process includes the steps of targeting a patch within the object appearing in the video content of the media file, tracking the movement of the patch over a sequence of frames within the media file, and, based on the tracked movement of the patch, writing locations of the patch within the sequence of frames to the trajectory. As used herein, the term "patch" is not meant to be limiting but may encompass any segment of the object that can be consistently identified within a predefined sequence of frames within the media file. For instance, the term patch may refer to a prominent set of pixels (e.g., eyes) within the object (e.g., bear) that exhibits an identifiable texture. See FIGS. 4 and 6 for a more detailed explanation of how the eyes of a bear may be utilized as a patch to establish a trajectory. Further, the term patch may broadly refer to any feature within any sequence of frames in the media file that it appears in a substantial number of the frames of the sequence of frames.

Next, the method involves performing an online rendering process upon initiating play of the media file. Typically, the online rendering process includes the steps of automatically selecting the advertisement and, while the media file is playing, dynamically placing the selected advertisement on top of the video content as a function of the locations within the trajectory. Accordingly, the advertisement and media file are rendered in a synchronized manner such that the advertisement appears to visually interact within the object, or at least some portion of the video content.

In another embodiment, aspects of the present invention involve a computerized method, implemented at one or more processing units, for utilizing an awareness of video content within a media file to select and to place a video advertisement therein. In particular, the method includes abstracting one or more coordinate locations of an object appearing in the video content of the media file. As used herein, the term "object" is not meant to be limiting, but may encompass an expansive scope of items, elements, lines, points, figures, or other aspects of the video content being presented upon playing the media file. In some embodiments, the object represents a most impressive figure or item within the video content. In one exemplary instance, with reference to FIGS. 3 and 5, the object may be a football. In another exemplary instance, with reference to FIGS. 4 and 6, the object may be the bear. As such, the thing that initially draws the attention of a viewer of the media file may be selected as the object. In other embodiments, the object may be determined by monitoring and collecting both the less intrusive and the most intrusive aspects of the video content, and ascertaining the object as the appropriate vehicle within to the video content to be associated with the advertisement. For instance, if the media file is a video clip of a football game and if it is determined that a football being thrown is the most impressive figure, the advertisement may be placed on the football and/or on the jersey of the player receiving the football, which is not as prominent yet still captures the user's attention.

Next, the computerized method continues with, at least temporarily, storing coordinate locations of the object on a trajectory. In one embodiment, the coordinate locations are stored in association within a sequence of frames comprising the media file. The trajectory is utilized to generate an ad-overlay that accommodates a container that holds the video advertisement. Typically, the container is positioned within the ad-overlay according to the coordinate locations stored in the trajectory. For instance, the container may be placed on top of the coordinate locations. By way of example, as discussed with reference to FIG. 5, placing the container on top of the coordinate locations involves inserting the video advertisement within the container and positioning the video advertisement on top of a football, which was previously determined to be the object.

Stated generally, the computerized method includes the steps of receiving the video advertisement, inserting the video advertisement into the container, and rendering the ad-overlay on top of the video content when playing the media file. As such, embodiments of the present invention provide for selection and presentation of advertisements, or the video advertisement. As utilized herein, the term "advertisement" or the phrase "video advertisement" is not meant to be limiting. For instance, advertisements could relate to a promotional communication between a seller offering goods or services to a prospective purchaser of such goods or services. In addition, the advertisement could contain any type or amount of data that is capable of being communicated for the purpose of generating interest in, or sale of, goods or services, such as text, animation, executable information, video, audio, and other various forms. By way of example, the advertisement may be configured as a digital image that is published within an advertisement space allocated within a UI display. In the instance described above, the UI display is rendered by a web browser or other application running on a client device. In an exemplary embodiment of video advertisements, the video advertisement may be specifically designed to visually interact with the object within the video content of the media file. The design of the video advertisement may be performed by an administrator associated with the web browser, a third-party advertising company, or any other entity capable of generating video content. Further, the design of the video advertisement may be based on the trajectory, the timestamps associated with locations of the object, a theme of the media file, an identity of the object, or any other useful criteria. Thus, the video advertisement may be developed in such a way as to visually interact with the video content when played.

Figure 2:
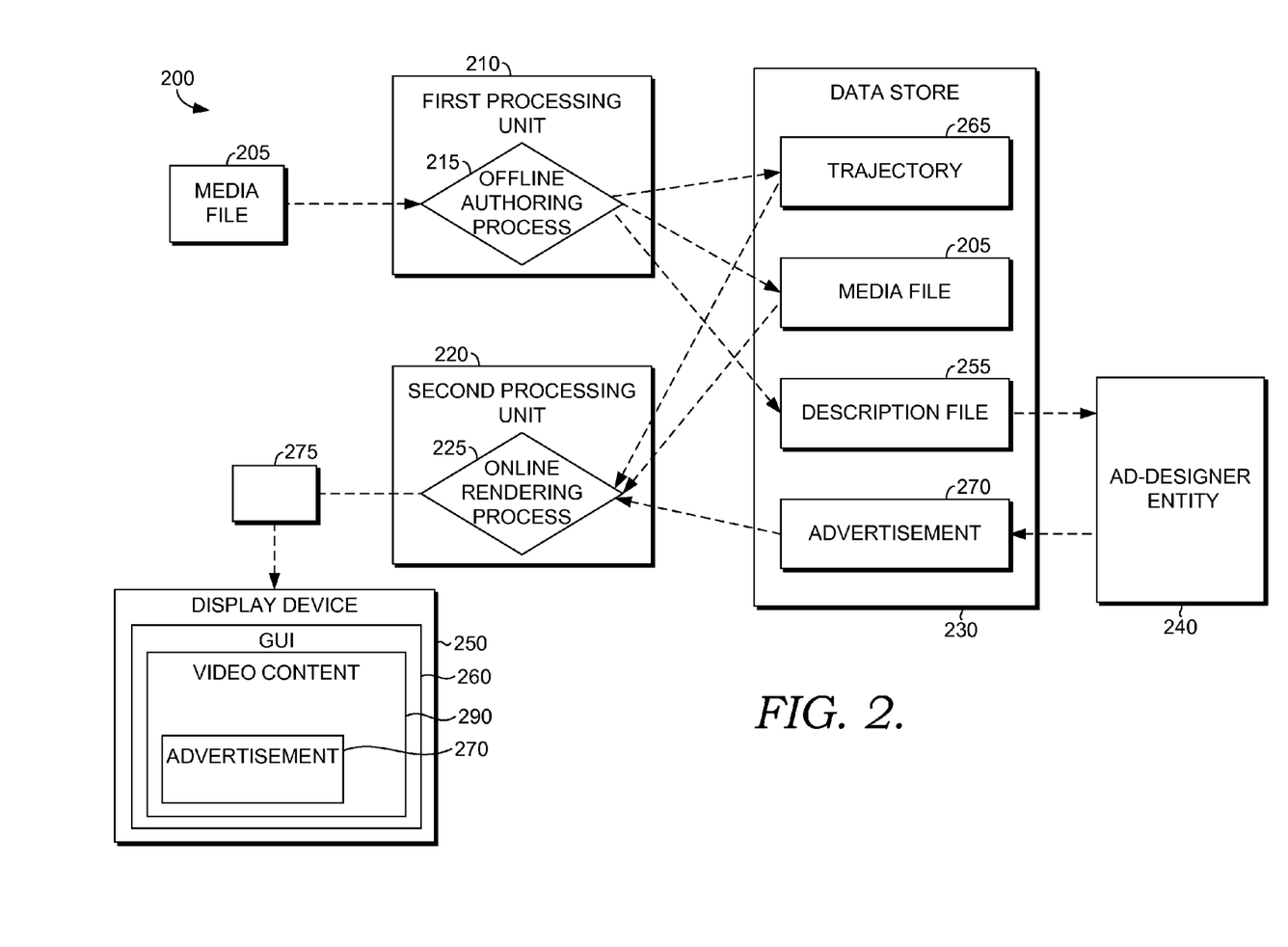
FIG. 2 is a block diagram illustrating a distributed computing environment, suitable for use in implementing embodiments of the present invention, that is configured to utilize awareness of video content within a media file to select and place an advertisement.

In yet another embodiment, the present invention encompasses a computer system for abstracting information from the video content of a media file and for placing the advertisement within the video content to visually interact therewith. Typically, the abstracted information allows for developing the visually interactive advertisement, as discussed immediately above. In an exemplary embodiment, and as shown in FIG. 2, the computer system includes a first processing unit and a second processing unit. The first processing unit is configured to accomplish at least the following steps: access the media file; track locations of an object appearing in the video content of the media file on a frame-by-frame basis; and write the tracked locations to a trajectory. The second processing unit is configured to accomplish the following steps: access the advertisement that is developed utilizing the trajectory; dynamically place the advertisement in a position on top of the video content based on the tracked locations; and render the video content in synchronization with animating the advertisement placed thereon. Accordingly, the animated advertisement appears to visually interact with the video content. In embodiments, these steps above may be performed by a single processing unit, on a multitude of processing units that are communicatively coupled (e.g., server cloud), and/or on one processing unit. Further, some of the steps may be carried out in an offline authoring process, while other steps may be carried out in real-time as the video content is streaming online. By way of example, the first processing unit may operate offline while the second processing unit may operate online.

Having briefly described an overview of embodiments of the present invention and some of the features therein, an exemplary operating environment suitable for implementing the present invention is described below.

Figure 1:
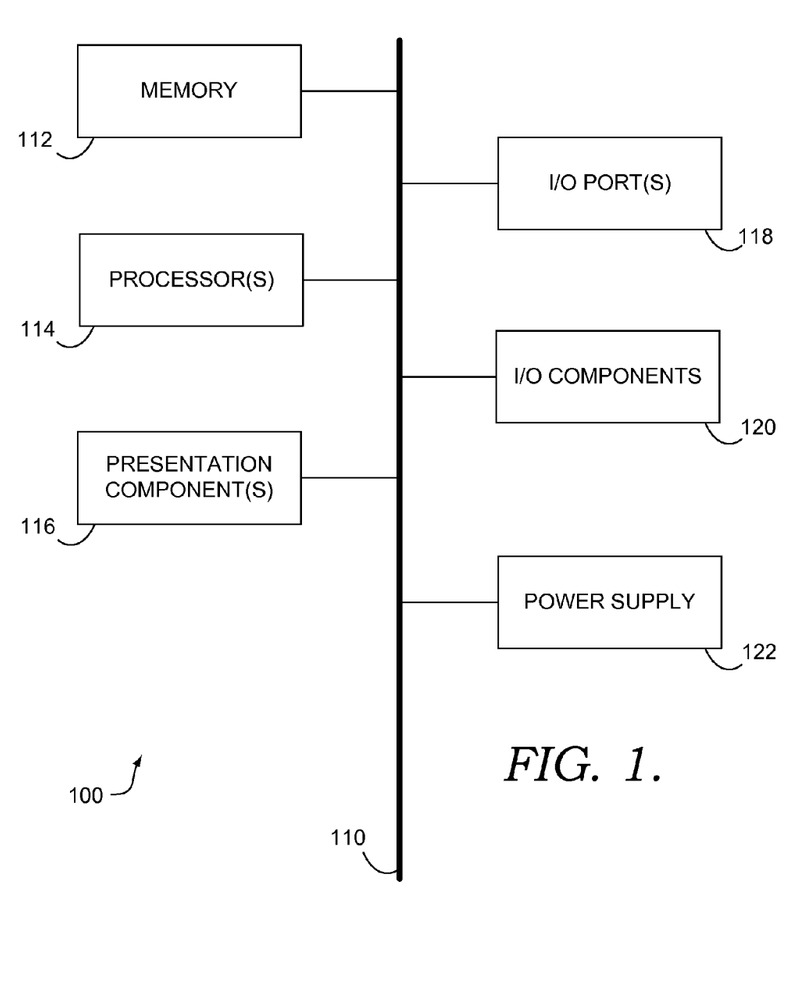
FIG. 1 is a block diagram of an exemplary computing environment suitable for use in implementing embodiments of the present invention.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks or implements particular abstract data types. Embodiments of the present invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear and, metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVDs), or other optical or holographic media; magnetic cassettes, magnetic tape, magnetic disk storage or other magnetic storage devices; or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built in. Illustrative components include a microphone, joystick, game pad, satellite dish, scanner, printer, wireless device, etc.

The system architecture for implementing the method of utilizing awareness of video content within a media file to select and place an advertisement will now be discussed with reference to FIG. 2. Initially, FIG. 2 is a block diagram illustrating a distributed computing environment 200 suitable for use in implementing embodiments of the present invention. The exemplary computing environment 200 includes a first processing unit 210, a second processing unit 220, at least one data store 230, a display device 250, and a network (not shown) that interconnects each of these items. Each of the first processing unit 210 and the second processing unit 220, shown in FIG. 2, may take the form of various types of computing devices, such as, for example, the computing device 100 described above with reference to FIG. 1. By way of example only and not limitation, first processing unit 210 and the second processing unit 220 may be a personal computer, desktop computer, laptop computer, consumer electronic device, handheld device (e.g., personal digital assistant), various servers, processing equipment, and the like. It should be noted, however, that the invention is not limited to implementation on such computing devices but may be implemented on any of a variety of different types of computing devices within the scope of embodiments of the present invention.

Typically, each of the first processing unit 210 and the second processing unit 220 includes, or is linked to, some form of a computing unit (e.g., central processing unit, microprocessor, etc.) to support operations of the component(s) running thereon. As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the first processing unit 210 and the second processing unit 220 in order to enable each device to perform communication-related processes and other operations (e.g., executing an offline authoring process 215 or an online rendering process 225). In another instance, the computing unit may encompass a processor (not shown) coupled to the computer-readable medium accommodated by each of the first processing unit 210 and the second processing unit 220.

Generally, the computer-readable medium includes physical memory that stores, at least temporarily, a plurality of computer software components that are executable by the processor. As utilized herein, the term "processor" is not meant to be limiting and may encompass any elements of the computing unit that act in a computational capacity. In such capacity, the processor may be configured as a tangible article that processes instructions. In an exemplary embodiment, processing may involve fetching, decoding/interpreting, executing, and writing back instructions.

Also, beyond processing instructions, the processor may transfer information to and from other resources that are integral to, or disposed on, the first processing unit 210 and the second processing unit 220. Generally, resources refer to software components or hardware mechanisms that enable the first processing unit 210 and the second processing unit 220 to perform a particular function. By way of example only, a resource accommodated by the first processing unit 210 includes a component to conduct the offline authoring process 215, while a resource accommodated by the second processing unit includes a component to conduct the online rendering process 225.

In embodiments, the second processing unit 220 may be integral to a computer that has a monitor to serve as the display device 250. In these embodiment, the computer may include an input device (not shown). Generally, the input device is provided to receive input(s) affecting, among other things, a media file 205, such as invoking the play of its video content 290, or altering properties of the video content being surfaced at a graphical user interface (GUI) 260 display. Illustrative input devices include a mouse, joystick, key pad, microphone, I/O components 120 of FIG. 1, or any other component capable of receiving a user input and communicating an indication of that input to the second processing unit 220.

In embodiments, the display device 250 is configured to render and/or present the GUI 260 thereon. The display device 250, which is operably coupled to an output of the second processing unit 220, may be configured as any presentation component that is capable of presenting information to a user, such as a digital monitor, electronic display panel, touch-screen, analog set-top box, plasma screen, Braille pad, and the like. In one exemplary embodiment, the display device 250 is configured to present rich content, such as the advertisement 270 embedded within video content 290 and/or digital images. In another exemplary embodiment, the display device 250 is capable of rendering other forms of media (e.g., audio signals).

The data store 230 is generally configured to store information associated with the advertisement 270 and the media file 205 that may be selected for concurrent presentation. In various embodiments, such information may include, without limitation, the advertisement 270, the media file 205, a description file 255 to be passed to an ad-designing entity 240; and a group of advertisements (being a compilation of advertisements developed specifically for presentation in tandem with the media file 205) associated within the media file 205, and a trajectory 265. In addition, the data store 230 may be configured to be searchable for suitable access to the stored advertisement 270 and the stored media file(s) 205. For instance, the data store 230 may be searchable for one or more of the advertisements within the group that are targeted toward interests of a user, relevant to the video content 290, and/or associated within the media file 205.

It will be understood and appreciated by those of ordinary skill in the art that the information stored in the data store 230 may be configurable and may include any information relevant to the storage or, access to, and retrieval of the advertisement 270 for placement within the video content 290 of the media file 205 and for rendering the integrated advertisement 270 and media file 205 on the GUI 260. The content and volume of such information are not intended to limit the scope of embodiments of the present invention in any way. Further, though illustrated as single, independent components, the data store 230 may, in fact, be a plurality of databases, for instance, a database cluster, portions of which may reside on the first processing unit 210, the second processing unit 220, another external computing device (not shown), and/or any combination thereof.

This distributed computing environment 200 is but one example of a suitable environment that may be implemented to carry out aspects of the present invention and is not intended to suggest any limitation as to the scope of use or functionality of the invention. Neither should the illustrated distributed computing environment 200 be interpreted as having any dependency or requirement relating to any one or combination of the devices 210, 220, and 250, the data store 230, and the components for carrying out the processes 215 and 225 as illustrated. In some embodiments, the components may be implemented as stand-alone devices. In other embodiments, one or more of the components may be integrated directly into the processing units 210 and 220. It will be appreciated and understood that the components for implementing the processes 215 and 225 are exemplary in nature and in number and should not be construed as limiting.

Accordingly, any number of components and devices may be employed to achieve the desired functionality within the scope of embodiments of the present invention. Although the various components and devices of FIG. 2 are shown with lines for the sake of clarity, in reality, delineating various components is not so clear, and, metaphorically, the lines would more accurately be grey or fuzzy. Further, although some components and devices of FIG. 2 are depicted as single blocks, the depictions are exemplary in nature and in number and are not to be construed as limiting (e.g., although individual processing units 210 and 220 are shown, the steps and operations performed by each may be performed by a single processing unit or other type of computing device).

Further, the devices 210, 220, and 250, and the data store 230, of the exemplary system architecture may be interconnected by any method known in the relevant field. For instance, they may be operably coupled via a distributed computing environment that includes multiple computing devices coupled with one another via one or more networks (not shown). In embodiments, the networks may include, without limitation, one or more local area networks (LANs) and/or wide area networks (WANs). Such networking environments are commonplace in offices, enterprise-wide computer networks, intranets, and the Internet. Accordingly, the network is not further described herein.

In operation, the components are designed to perform the offline authoring process 215 and the online rendering process 225. In embodiments, the offline authoring process 215 includes a plurality of discrete steps that may include the following: targeting a patch within an object appearing in the video content 290 of the media file 205; tracking movement of the patch over a sequence of frames within the media file 205; based on the tracked movement of the patch, abstracting coordinate locations of the patch within the video content 290; and writing locations of the patch within the sequence of frames to the trajectory 265.

Accordingly, various aspects of embodiments of the present invention involve abstracting information from the media file 205. By way of clarification, as used herein, the phrase "media file" is not meant to be construed as limiting, but may encompass any general structure for time-based multimedia, such as video and audio. Further, the media file 205 may be configured with any known file formats (e.g. container formats, MP4, and 3GP) that facilitates interchange, management, editing, and presentation of the video content 290. The presentation may be local, via a network, or other streaming delivery mechanism. For instance, the media file may be a digital video that is configured to play upon receiving a user-initiated selection (during an online computing session) directed thereto. Also, upon implementing the offline authoring process 215, the media file 205 may be accessed at a variety of storage locations. For instance, these storage locations may reside locally on the first processing unit 210, in the possession of a user (e.g., internal folders, CD memory, external flash drives, etc), online space accommodated by remote web servers responsible for managing media, a networking site, or a public database for hosting a media collection.

Upon retrieving the media file 205, the offline authoring process 215 abstracts information from the media file 205 to generate a trajectory 265 and/or a description file 255. The "trajectory" 265 essentially serves as a vehicle to store the abstracted information in a logical format. By way of example, if the abstracted information includes locations of an object within the video content 290 of the media file 205, the trajectory may assume a form of an XML file that stores the locations as metadata. The trajectory 265 may be distinct from the media file 205, or may comprise data appended to the media file 205 such that media file 205 includes the abstracted information, yet the video content 290 remains unaltered.

Although several configurations of the trajectory 265 have been described, it should be understood and appreciated by those of ordinary skill in the art that other types of suitable formats that can persist information abstracted from the media file 205 may be used, and that embodiments of the present invention are not limited to those types and formats of trajectories described herein. For instance, the trajectory 265 may include timestamps associated with each of the locations of the object abstracted from the media file 205, where the timestamps are potentially utilized for developing the advertisement 270 and for starting and stopping play of the advertisement 270 in a manner that synchronizes the presentation of it and the media file 205. Consequently, in this instance, the trajectory 265 persists a robust set of information for accurately describing a location and timing of the object's existence at the location within the media file 205.

Figure 3:
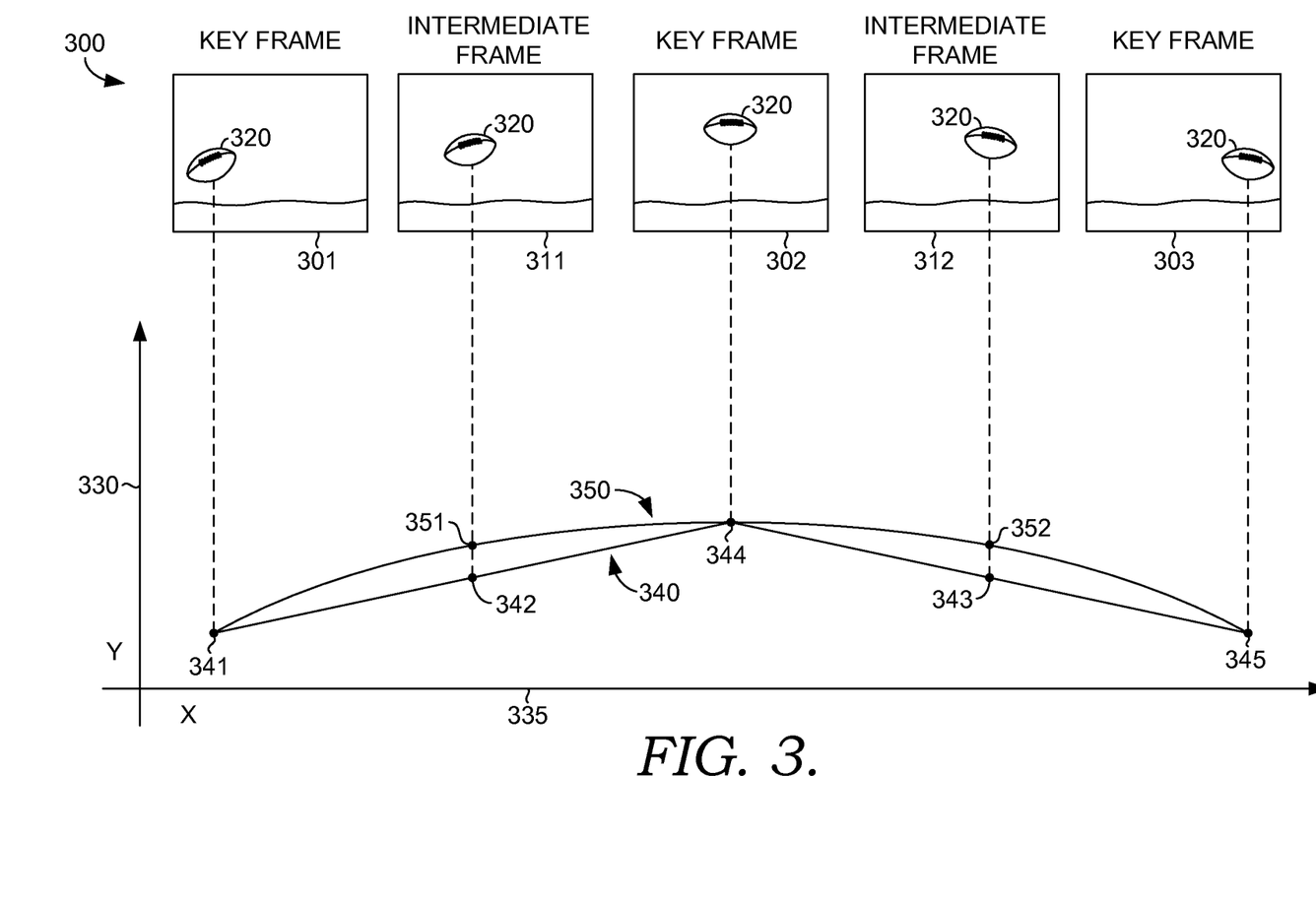
FIG. 3 is a diagrammatic view of a sequence of frames of a media file with an object being tracked therein, in accordance with an embodiment of the present invention.

One embodiment of abstracting information from the media file 205 is shown in FIG. 3. With reference to FIG. 3, a diagrammatic view 300 of a sequence of frames 301, 302, 303, 311, and 312 of the media file 205 is illustrated with an object 320 being tracked therein, in accordance with an embodiment of the present invention. As shown, the object 320 is represented as a football. As discussed above, however, the object 320 may be any identifiable item occurring in the video content 290.

Initially, the sequence of frames 301, 302, 303, 311, and 312 is analyzed to find the object 320 within the video content 290. In embodiments, analyzing involves selecting key frames, shown at reference numerals 301, 302, and 303, and labeling them as such. Then locations 341, 343, and 345 of positions of the object 320 within the key frames 301, 311, and 312, respectively, are manually ascertained. These locations 341, 340, and 345 may be retained in a listing of locations within the trajectory 265 and may be associated with their respective key frames 310, 302, and 303. As illustrated in FIG. 3, the locations 341, 343, and 345 of positions of the object 320 are X 335 and Y 330 coordinates of the object 320 relative to the key frames 310, 302, and 303.

Next, a mechanism is applied to automatically interpolate movement of the object 320 on intermediate frames, shown at reference numerals 311 and 312, that are in-between the key frames 301, 302, and 303. In embodiments, the mechanism may comprise a video or vision computing algorithm (e.g., various research algorithms used to understand the video content 290 and recognize the object 320 therein) to review the locations 341, 343, and 345 of the object 320 in the key frames 310, 302, and 303 and to interpolate predicted locations 342 and 344 for the intermediate frames 311 and 312, respectively. Interpolation may be carried out by deducing a difference in location of the object 320 from one frame to the next, and identifying the predicted locations 342 and 344 within the difference, thereby linking the locations 341, 343, and 345 into a continuous movement pattern of the object 320. Accordingly, a semiautomatic procedure is conducted for accurately pulling locations 341, 342, 343, 344, and 345 from the video content 290. Advantageously, this semiautomatic procedure is scalable to accommodate abstracting accurate locations from large media files because it is not necessary to manually recognize and record a location of the object therein for each frame of a selected sequence of frames in which the advertisements will be placed.

Although only one intermediate frame is illustrated as existing in-between a preceding and a succeeding key frame, it should be understood and appreciated by those of ordinary skill in the art that other types of suitable orders and arrangements of manually analyzed and automatically analyzed frames may be used, and that embodiments of the present invention are not limited to those alternating key and intermediate frames as described herein. For instance, if the object 320 is difficult to automatically track or is taking a sporadic path of movement, there may be five intermediate frames in-between successive key frames. But, if the object 320 is easily tracked or is taking a predictable path of movement, there may be twenty intermediate frames in-between successive key frames.

In an exemplary embodiment, an additional algorithm is executed for automatically tuning the predicted locations generated by interpolation. The tuning process may involve automatically locating the object 320 using known characteristics of the object 320, such as shape, color, size, and predicted location at a particular frame. Further, known characteristics may include an identifiable texture associated with a patch on the object 320, as discussed more fully below with reference to FIG. 4. Once the tuning process locates the object 320, the predicted locations 342 and 343 may be tuned to correspond with an actual position of the object. These tuned locations are indicated by reference numerals 351 and 352. Accordingly, an accurate arc-shaped path of the object 320, which follows the true movement of a football through the air, is saved to the trajectory 265, thereby correcting deficiencies of the interpolation process. If the tuning process is unable to find the object 320 in the intermediate frames 311 and 312, the predicted locations 342 and 343 are saved to the trajectory, which still indicate a fairly accurate representation of the true movement of the football through the air.

In both the tuning process and the manual process for identifying a location of the object 320 in a particular frame, characteristics of the object may be used. For instance, a shape or color of the object 320 may be known and applied to locate the object among other objects within the video content 265. In an exemplary embodiment, a patch may be used to assist in locating the object 320. The patch will now be discussed with reference to FIG. 4. Initially, FIG. 4 is a diagrammatic view of a user interface (UI) display 400 illustrating an object 405, within video content 415, with a patch 410 selected thereon, in accordance with an embodiment of the present invention.

Figure 4:
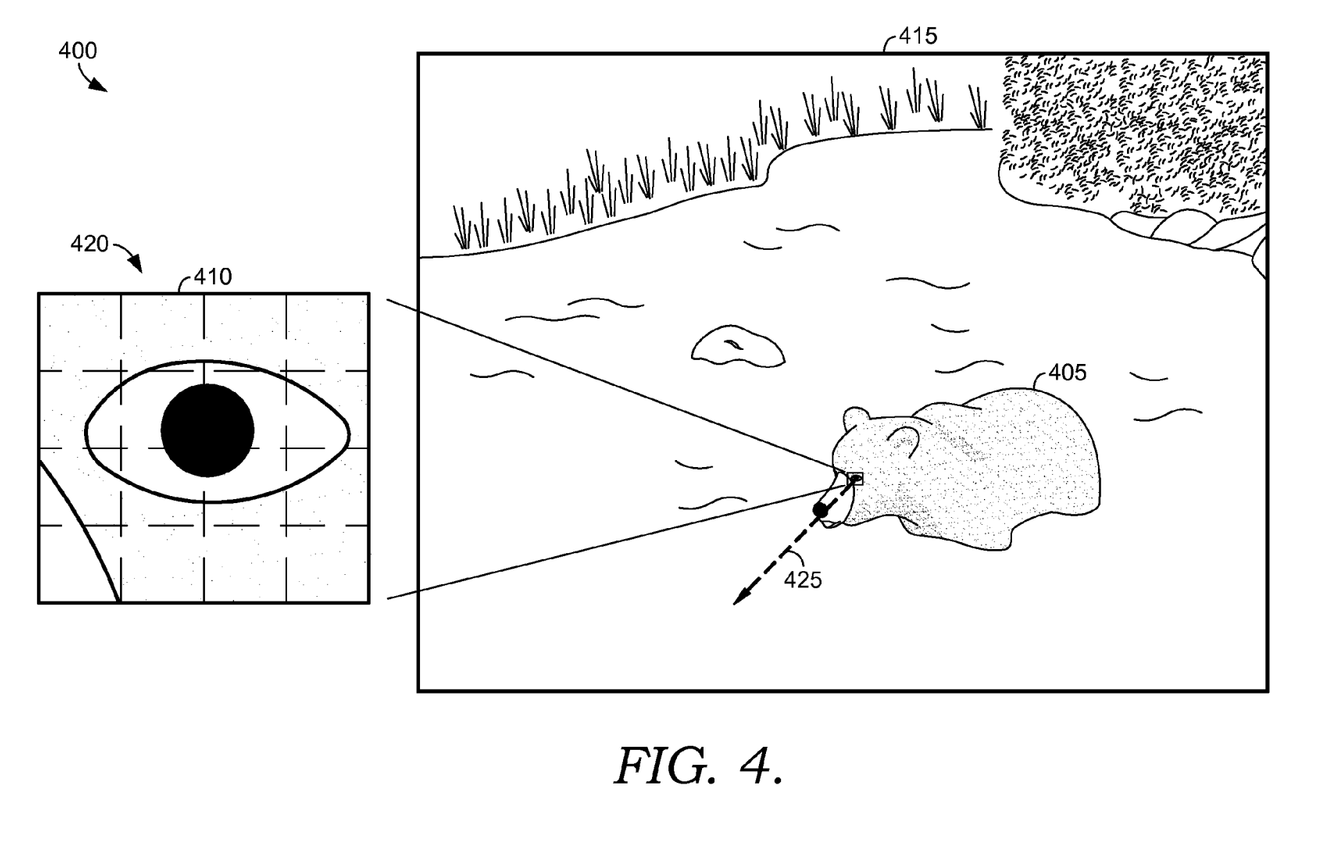
FIG. 4 is a diagrammatic view of a user interface (UI) display illustrating an object, within the video content, with a patch selected thereon, in accordance with an embodiment of the present invention.

As shown in FIG. 4, the patch 410 (eye) is an area of the object 405 (bear) that is generally easy to identify and frequently appears within the sequence of frames. Further, it is preferred that the patch 410 be of substantially consistent shape and color, have invariant feature points, and be somewhat prominent. As shown, the patch 410 covers a rectangular area (5×5 window of pixels 420) with a distinct texture (contrasting dark and light colors of the eye as compared against the brown fur of the bear) that is targeted within the object 405, or at least associated with the object 405. As such, the window of pixels 420 can be used to manually or automatically identify a location of the object 405, or specific portions thereof.

Further, the window of pixels 420 can be used to manually or automatically identify a vector 425 established by the window, or set, of pixels 420 that are designated as the patch 410. Typically, attributes of the identified vector 425 are maintained in the trajectory 265. These attributes may include a radial direction and origin. In operation, the attributes in the trajectory 265 are employed to render an advertisement at positions within the video content 290 that consistently intersect the identified vector 425.

Often the vector 425 is based on a feature of the object 405 that naturally provides a linear subspace. For instance, as illustrated in FIG. 4, identifying attributes of the vector 425 involves ascertaining line-of-sight originating from one or more eyes of the object 405. In operation, employing the attributes in the trajectory 265 to render an advertisement at a position within the video content 290 that consistently intersects the vector 425 involves placing the advertisement in a position that intersects the line-of-sight of the object 405, or bear. As such, because the bear appears to be looking at the advertisement upon placement, the attention of a viewer of the media file 205 would likely gravitate toward the advertisement as well.

Returning to FIG. 2, as discussed above, the first processing unit 210 may conduct the offline authoring process 215 that includes generating a description file 255. Generating the description file 255 may involve analyzing the video content 290 to determine a theme of the media file 205, and combining the media-file theme with the trajectory 265 to form the description file 255. As used herein, the phrase "description file" is not meant to be limiting, but may encompass a broad range of vehicles for carrying information related to the video content 290 to an ad-designer entity 240 in order to assist in developing the advertisement 270. As such, the description file 255 may include some or all data from the trajectory 265, such as coordinate locations and timestamps of positions of an object, as well as a theme or topic of the media file 205 and an identity of the object.

Figure 6:
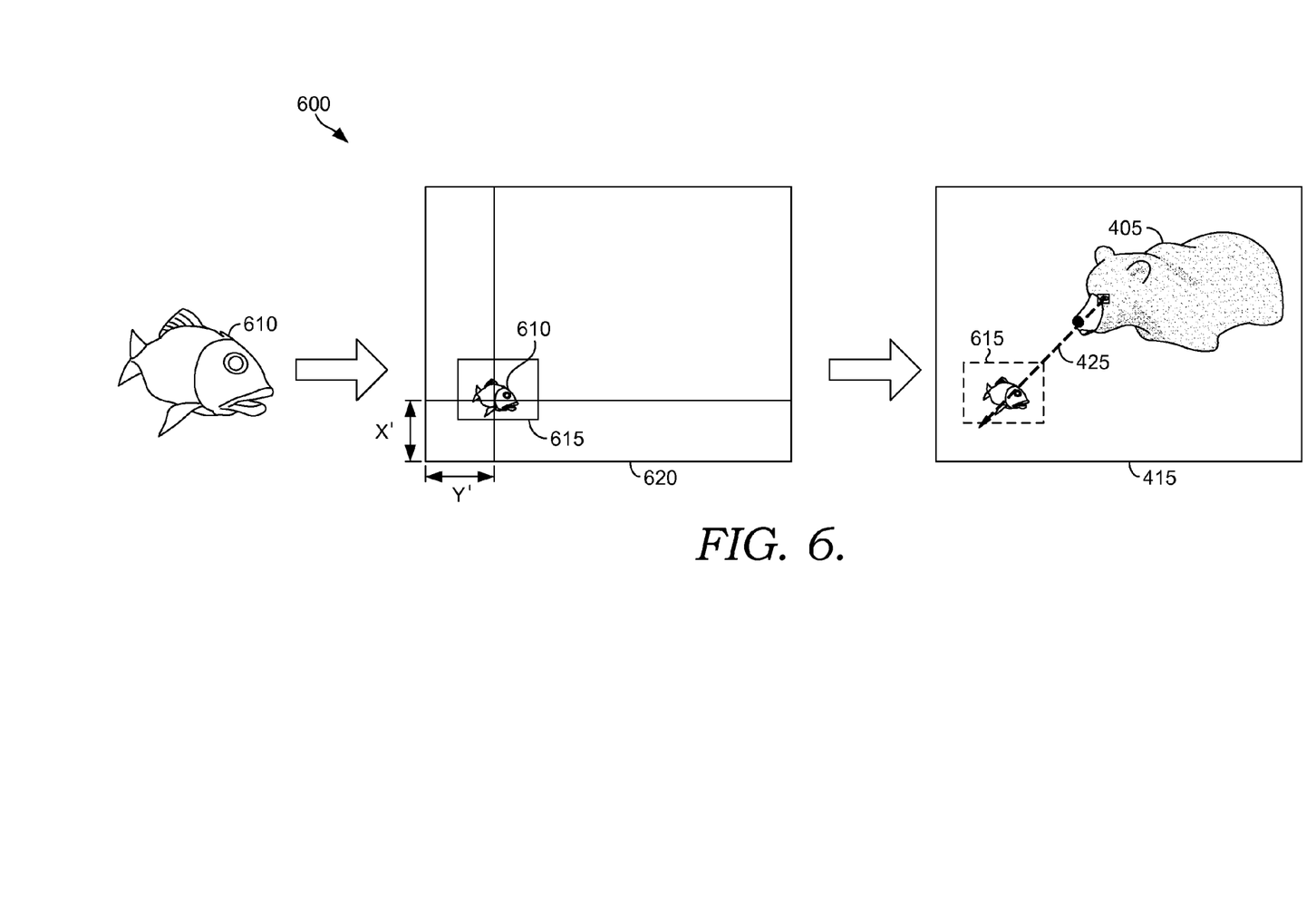
FIG. 6 is a diagrammatic view of animation of an advertisement being incorporated into video content via an ad-overlay, in accordance with an embodiment of the present invention.

Upon developing the description file 255, it may be passed to the ad-designer entity 240. In embodiments, the ad-designer entity 240 uses some or all information carried by the description file 255 to create the advertisement 270. By way of example, the creation of the advertisement 270 may be based on a concept of a bear in a stream, as illustrated in FIG. 4, such that an appropriate subject of the advertisement 270 may be an animated fish or other water-based animation that is relevant to the bear in a stream. (This example is depicted in FIG. 6, which is discussed more fully below.) Accordingly, because the ad-designer entity 240 knows the theme of the media file 205, the advertisement 270 may be created in a way that visually interacts within the context of the video content 290 and appears more natural or sophisticated.

As shown in FIG. 2, only one ad-designer entity 240 is illustrated. However, it should be appreciated that a plurality of advertisement designers may have access to the description file 255 and may create a variety of advertisements that are relevant to the theme of the media file 205 and that can be placed in the video content 290. Accordingly, in embodiments, these relevant advertisements are joined to a group associated with the media file 205. As used herein, the phrase "group" generally refers to a compilation of advertisements developed specifically for being presented in tandem with the media file 205. In operation, the group may be stored on the data store 230 and may be accessible by the second processing unit 220 for gathering a relevant advertisement to be placed on the video content 290 during the online rendering process 225. In one instance, the online rendering process 225 applies a selection scheme that provides rules for choosing one of the relevant advertisements within the group (e.g., on a rotational basis).

Further, the online rendering process 225 carries out a plurality of steps for placing the advertisement 270 on top of the video content 290. Initially, the trigger for implementing the online rendering process 225 involves a user selection of a representation of the media file 205. This user selection may involve a user-initiated click action directed toward a uniform resource locator (URL) linked to the media file 205. Or, the user selection may involve launching a web browser that is configured to present the media file 205. In yet other embodiments, the user selection involves receiving an indication that a user-initiated selection occurred with respect to a visual representation of the advertisement 270.

Incident to invoking the online rendering process 225, a variety of steps are performed to manage presentation of the advertisement 270 by incorporating or inserting the advertisement within the video content 270. Typically, some or all aspects of incorporating the advertisement 270 are performed in a real-time basis as the video content 290 is streaming to the second processing unit 220. The advertisement 270 incorporated into the streaming video content 290 is represented by reference numeral 275, which is being delivered to the display device 250 for rendering.

Figure 5:
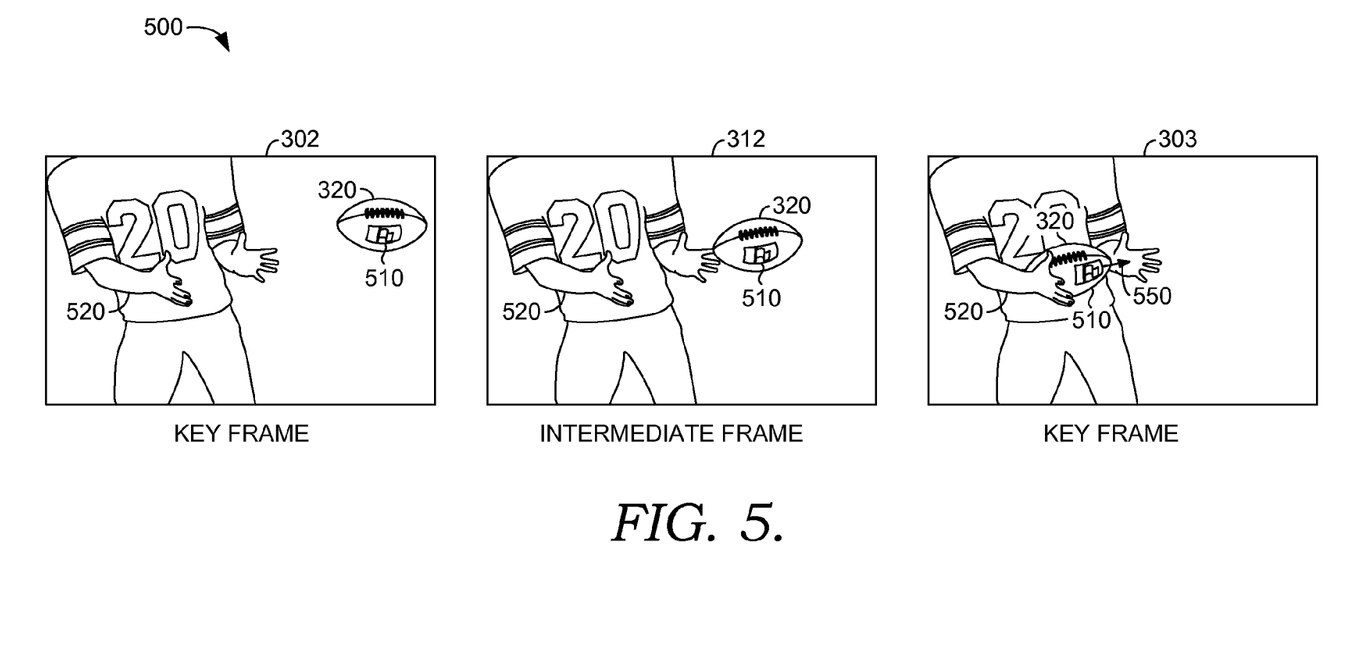
FIG. 5 depicts progressive UI displays illustrating stages of placing an advertisement on top of the video content within a sequence of frames, in accordance with an embodiment of the present invention.

The variety of steps performed by the online rendering process 225 include one or more of the following, in no particular order: selecting the advertisement 270; generating an ad-overlay that accommodates a container to hold the advertisement 270, where the container is positioned within the ad-overlay according to the trajectory 265; inserting the advertisement 270 into the container; and rendering the ad-overlay on top of the video content 290 when playing the media file 205. A particular embodiment of performing these steps is depicted at FIG. 5. In particular, FIG. 5 depicts progressive UI displays illustrating stages of placing an advertisement 510 (flag waving in the wind) on top of the object 320 (football) within the sequence of frames 302, 312, and 303, in accordance with an embodiment of the present invention. As shown, the advertisement 510 can be placed on the object 320 in such a manner that the flag remains on the football throughout the movement of the football through the air. As such, because the advertisement 510 is placed on a prominent figure within the context of the video content, attention is drawn to the advertisement 510.

Further, a trajectory associated with the object 320 allows for creation and placement of the advertisement 510 such that it visually interacts with the video content. In one embodiment, the trajectory provides an advertisement designer with a concept of a path of the object 320 allowing the advertisement designer to animate the advertisement 510 in a meaningful way. As illustrated, the flag (advertisement 510) is blowing in a direction as if it were attached to the football (object 320) as it travels through the air. In another embodiment, the trajectory allows the online rendering process to dynamically place the advertisement 510 on top of the video content by rendering the advertisement 510 at positions within the video content that substantially correspond to the locations of the object 320, or patch, written to the trajectory. Accordingly, the flag may be placed, based on X and Y coordinate locations of the football, along its entire path.

Further, other aspects of the video content may be used to place the advertisement 510. For instance, an interesting map that records locations of significant objects embedded within the video content may be applied. As used herein, the phrase "interesting map" relates to information gathered from the sequence of frames that may be employed for positioning the advertisement 510 (flag) on top of the object 320 (football). For instance, the interesting map may include information about another object 520 (receiver) within the video content. In operation, the position of the advertisement 510 may be adjusted by an offset 550 so that it does not obscure the object 520 when being placed. As such, the interesting map allows for building freedom into the placement of the advertisement 510 about the locations in the trajectory. This freedom provides the ability to rotate or translate laterally/vertically the advertisement 510 to avoid blocking any significant object (e.g., the object 520) or other critical aspects in the video content.

Returning to FIG. 2, in embodiments, the online rendering process 225 is configured to dynamically place the advertisement 270 within the video content 290 by using an ad-overlay. The application of the ad-overlay will now be discussed with reference to FIG. 6. In particular, FIG. 6 is a diagrammatic view 600 of animation of an advertisement 610 being incorporated into video content 415 via an ad-overlay 620, in accordance with an embodiment of the present invention. Initially, the advertisement 610 is created to include animation that visually interacts with the video content 415. As illustrated, the fish (advertisement 610) is created to swim within a stream (video content 415). Next, the ad-overlay 620 is prepared with a container 615. The container 615 is placed within the ad-overlay 620 as a function of the locations of the object 405 or a vector 425 originating from the object 405. By way of example, the container 615 is placed at an intersection with the vector 425 using X' and Y' coordinate locations of the vector 425. By placing the container 615, with the advertisement 610 inserted therein, on top of the vector 425, an illusion that the bear (object 405) is watching the fish (advertisement 610) swimming in the stream (video content 415) is manufactured. Also, the container 615 may be placed in proximity with X and Y coordinate locations of the object 405 itself. Accordingly, the use of the container 615 to dynamically place the advertisement 610 within the video content 415 provides a suitable mechanism for positioning the advertisement 610 based on the trajectory, thereby generating the visual interaction between the advertisement 610 and the object 405.

Figure 7:
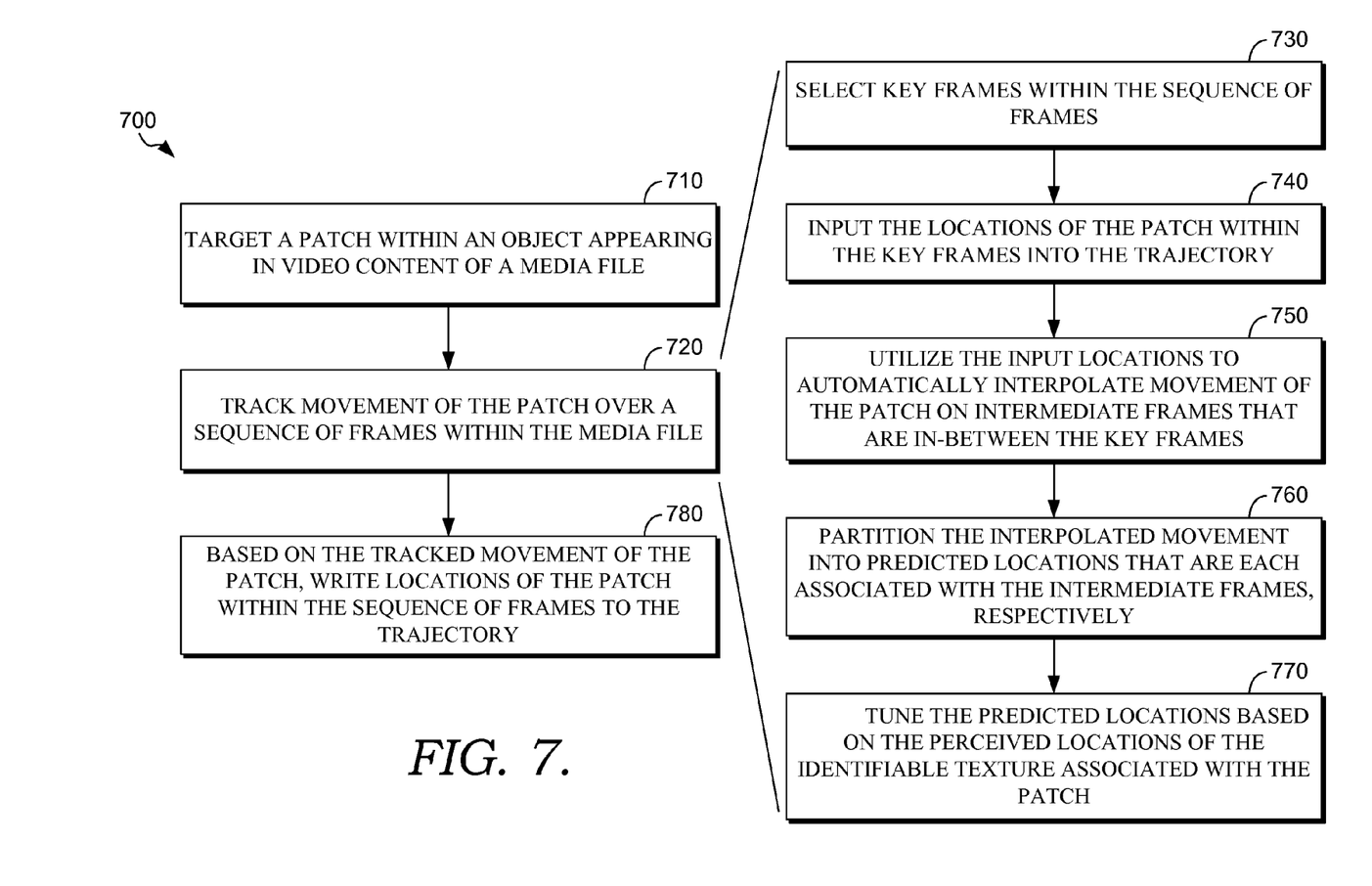
FIG. 7 is a flow diagram illustrating an overall method for performing an offline authoring process to generate a trajectory, in accordance with an embodiment of the present invention.

Turning now to FIG. 7, an operational flow diagram 700 of one embodiment of the present invention is shown. Generally, FIG. 7 illustrates a high-level overview of techniques for performing an offline authoring process to generate a trajectory, in accordance with an embodiment of the present invention. Although the terms "step," "operation," and/or "block" may be used herein to connote different elements of methods employed, the terms should not be interpreted as implying any particular order among or between various steps herein disclosed unless and except when the order of individual steps is explicitly described.

The exemplary flow diagram 700 commences with targeting a patch within an object appearing in video content of the media file, as indicated at block 710. As described with reference to FIG. 4, the patch 410 may cover an identifiable texture (e.g., eye) of the object (e.g., bear). Next, with reference to FIG. 7, the movement of the patch is tracked over a sequence of frames (e.g., employing the offline authoring process 215 of FIG. 2), as indicated at block 720. In embodiments, tracking the movement of the patch, or object, may involve the following steps: selecting key frames within the sequence of frames (see block 730); manually inputting the locations of the patch within the key frames into the trajectory (see block 740); and utilizing the input locations to automatically interpolate movement of the patch on intermediate frames that reside in-between the key frames (see block 750). Upon performing this semiautomatic procedure described in blocks 730, 740, and 750, the process of tracking movement of the patch may further include the following steps: partitioning the interpolated movement into predicted locations that are each associated with the intermediate frames, respectively (see block 760); and tuning the predicted locations based on perceived locations of an identifiable texture associated with the patch (see block 770). Based on the tracked movement of the patch, the locations of the patch may be written to a trajectory 780.

Figure 8:
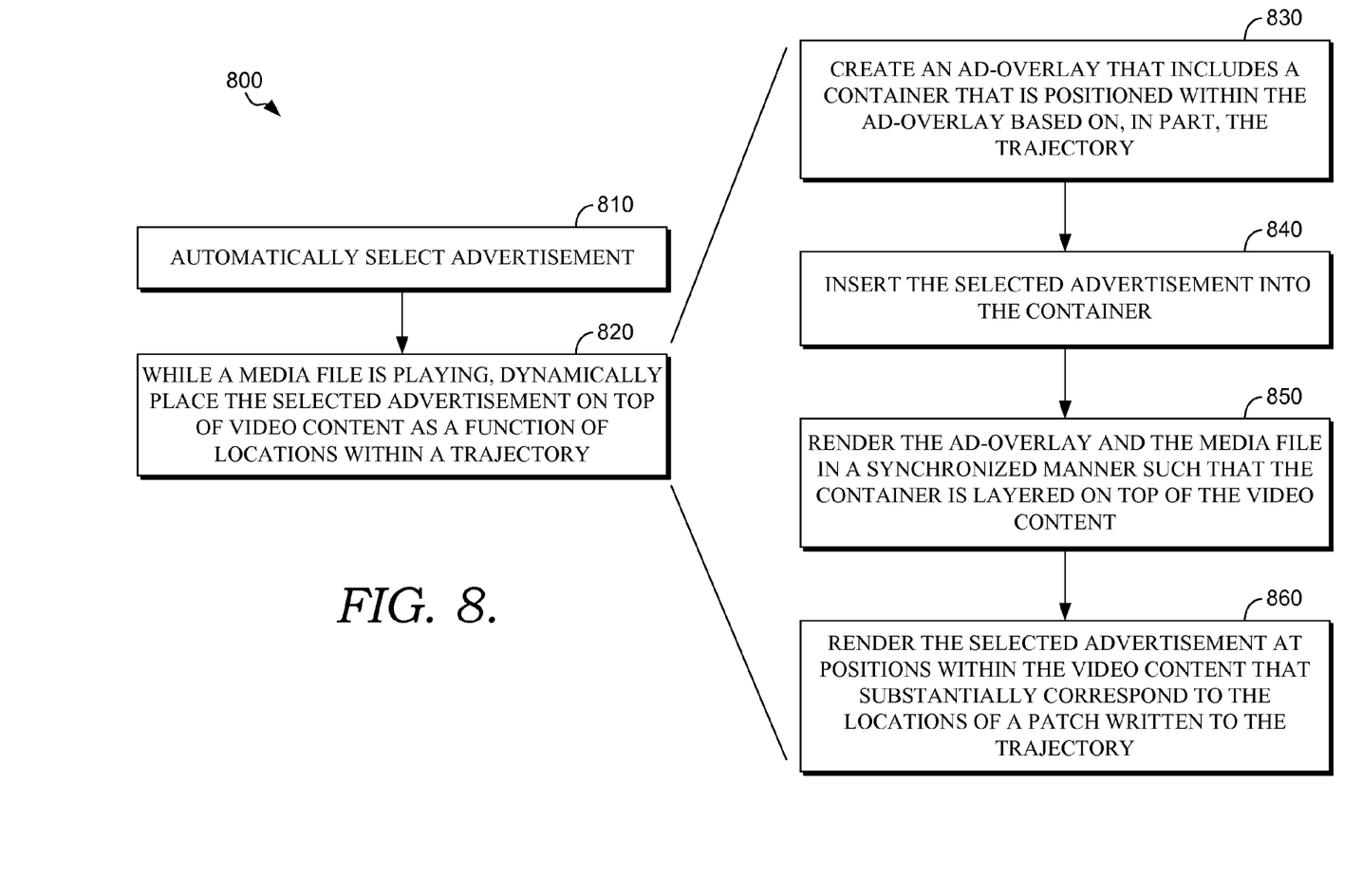
FIG. 8 is a flow diagram illustrating an overall method for performing an online rendering process upon initiating play of the media file, in accordance with an embodiment of the present invention.

Turning now to FIG. 8, a flow diagram illustrating an overall method 800 for performing an online rendering process (e.g., online rendering process 225 performed by the second processing unit 220 of FIG. 2) upon initiating play of the media file is shown, in accordance with an embodiment of the present invention. Initially, the method 800 includes automatically selecting an advertisement (e.g., utilizing a selection scheme), as indicated at block 810. Upon selecting the advertisement, and while the media file is playing, the method 800 involves dynamically placing the selected advertisement on top of the video content of the media file. As indicated at block 820, the advertisement is dynamically placed as a function of the locations saved to the trajectory. In an exemplary embodiment, the process of dynamically placing includes the following steps: creating an ad-overlay that includes a container that is positioned within the ad-overlay based on the trajectory (see block 830); inserting the selected advertisement into the container (see block 840); and rendering the ad-overlay and the media file in a synchronized manner such that the container is layered on top of the video content (see block 850). In embodiments, the process of dynamically placing may further include rendering the selected advertisement at positions within the video content that substantially correspond to the locations of a patch written to the trajectory, as indicated at block 860. As such, the advertisement will appear to visually interact with an object in the video content and draw a user's attention to the advertisement.

The present invention has been described in relation to particular embodiments, which are intended in all respects to be illustrative rather than restrictive. Alternative embodiments will become apparent to those of ordinary skill-in-the-art to which the present invention pertains without departing from its scope.

From the foregoing, it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated by and is within the scope of the claims.

The invention claimed is:

1. A computerized method for dynamically placing an advertisement on top of video content in a media file based on movement of an object therein, the method comprising:
    performing an offline authoring process for generating a trajectory, the offline authoring process comprising:
        (a) targeting a patch within the object appearing in the video content of the media file;
        (b) tracking the movement of the patch over a sequence of frames within the media file; and
        (c) based on the tracked movement of the patch, writing locations of the patch and timestamps associated with the locations of the patch within the sequence of frames to the trajectory, wherein the trajectory comprising a combination of locations and timestamps for a patch is used to generate a description file, wherein the description file comprises information such that one or more advertisements are created for the corresponding media file using the description file, wherein creating the one or more advertisements is based on:
            (1) receiving, at an ad-designer entity, the description file having the trajectory; and
            (2) creating the advertisement based on the description file;
    performing an online rendering process upon initiating play of the media file, the online rendering process comprising:
        (a) automatically selecting an advertisement
        (b) while the media file, corresponding to the advertisement generated at the ad-designer entity, is playing, dynamically placing the selected advertisement on top of the video content as a function of the locations and timestamps within the trajectory; and
        (c) starting or stopping play of the advertisement on the media file as a function of the timestamps within the trajectory.

2. The computerized method of claim 1, wherein the patch comprises a prominent set of pixels within the object that exhibits an identifiable texture.

3. The computerized method of claim 2, wherein tracking the movement of the patch over a sequence of frames within the media file comprises:
    selecting key frames within the sequence of frames; and
    inputting the locations of the patch within the key frames into the trajectory.

4. The computerized method of claim 3, wherein tracking the movement of the patch over a sequence of frames within the media file further comprises:
    utilizing the input locations to automatically interpolate movement of the patch on intermediate frames that are in-between the key frames;
    partitioning the interpolated movement into predicted locations that are each associated with the intermediate frames, respectively; and
    tuning the predicted locations based on automatically perceived locations of the identifiable texture associated with the patch.

5. The computerized method of claim 4, wherein the offline authoring process further comprises:
    associating a timestamp with each of the input locations and the predicted locations; and
    writing the input locations, the predicted locations, and the associated timestamps to the trajectory.

6. The computerized method of claim 1, wherein dynamically placing the selected advertisement on top of the video content comprises:
    creating an ad-overlay that includes a container that is positioned within the ad-overlay based on, in part, the trajectory, wherein the container governs an orientation of the selected advertisement and a size of a region that the selected advertisement will occupy; and
    rendering the ad-overlay and the media file in a synchronized manner such that the container is layered on top of the video content.

7. The computerized method of claim 1, wherein dynamically placing the selected advertisement on top of the video content comprises rendering the selected advertisement at positions within the video content that substantially correspond to the locations of the patch written to the trajectory, wherein the locations of the patch are formatted as X and Y coordinates.

8. The computerized method of claim 1, wherein dynamically placing the selected advertisement on top of the video content comprises:
    generating an interesting map that records locations of significant objects embedded within the video content; and
    rendering the selected advertisement at positions within the video content that are offset from the locations of the patch written to the trajectory, wherein the offset is a function of the recorded locations included in the interesting map, and wherein the offset prevents obscuring the significant objects when dynamically placing the selected advertisement on top of the video content.

9. The computerized method of claim 2, wherein dynamically placing the selected advertisement on top of the video content comprises:
    identifying a vector established by the set of pixels, within the object, that are designated as the patch, wherein attributes of the identified vector are maintained in the trajectory, and wherein the attributes of the identified vector include an origin and radial direction from the origin; and
    employing the trajectory to render the selected advertisement at positions within the video content that consistently intersects a linear subspace of the identified vector without obscuring the patch, wherein the linear subspace is defined, in part, by the origin of the vector and the radial direction from the origin.

10. The computerized method of claim 9, wherein identifying a vector established by the set of pixels comprises ascertaining line-of-sight originating from one or more eyes of the object, and wherein employing the trajectory to render the selected advertisement at a position within the video content that consistently intersects the linear subspace of the identified vector comprises placing the selected advertisement in a position that intersects the line-of-sight.

11. The computerized method of claim 1, wherein the method further comprises:
   analyzing the video content to determine a theme of the media file; and
   packaging the theme of the media file in combination with the trajectory to form the description file.

12. The computerized method of claim 11, wherein the method further comprises:
   passing the description file to the ad-designing entity; and
   receiving from the ad-designing entity at least one video-based advertisement that includes an animation relevant to the theme of the media file.

13. The computerized method of claim 12, wherein the method further comprises:
   joining the at least one received video-based advertisement to a group associated with the media file, wherein the group is a compilation of advertisements developed specifically for being presented in tandem with the media file; and
   applying a selection scheme that provides rules for choosing one of the advertisements within the compilation on a rotational basis.

14. A computerized method, implemented at one or more processing units, for utilizing an awareness of video content within a media file to select and place a video advertisement therein, the method comprising:
   abstracting one or more coordinate locations of an object appearing in the video content of the media file;
   at least temporarily, storing the one or more coordinate locations, in association within a sequence of frames comprising the media file, respectively, on a trajectory, wherein the trajectory defines one or more coordinate locations and timing of the object within the media file;
   generating an ad-overlay that accommodates a container to hold the video advertisement, wherein the container is positioned within the ad-overlay according to the trajectory;
   analyzing the video content to determine a theme of the media file;
   generating a description file comprising a combination of the theme and the trajectory;
   passing indicia of the description file to an ad-designing entity;
   receiving from the ad-designing entity the video advertisement that includes an animation that is both:
   (a) relevant to the theme in the description file of the media file, and
   (b) specifically designed, based on the trajectory and information in the description file of the media file to visually interact with the object within the video content of the media file;
   inserting the video advertisement into the container; and
   rendering the ad-overlay on top of the video content of the media file.

15. The computerized method of claim 14, wherein the object represents a most-impressive figure that is intended by a source of the media file to be the subject of the video content.

16. The computerized method of claim 14, wherein storing the one or more coordinate locations on the trajectory comprises writing metadata representing the one or more coordinate locations to the trajectory formatted as an extensible markup language (XML) file.

17. The computerized method of claim 14, further comprising generating the ad-overlay incident to receiving an indication that a user-initiated selection occurred with respect to a visual representation of the video advertisement.

18. The computerized method of claim 14, further comprising: abstracting timestamps for each of the one or more coordinate locations, wherein the timestamps are based on temporal intervals between consecutive frames within the sequence of frames; and
   writing the abstracted timestamps to the trajectory.

19. The computerized method of claim 18, further comprising:
   communicating the trajectory to the ad-designing entity; and
   receiving from the ad-designing entity the video advertisement, wherein the video advertisement is developed in accordance with the abstracted timestamps allowing for the visual interaction with the object.

20. A computer system for abstracting information from video content of a media file and for placing an advertisement within the video content that visually interacts therewith, wherein the abstracted information allows for developing the visually interactive advertisement:
   a first processing unit configured to access the media file, to track locations and timestamps associated with the locations of an object appearing in the video content of the media file on a frame-by-frame basis, and to write the tracked locations and associated timestamps to a trajectory, wherein the trajectory comprising a combination of locations and timestamps of the object is used in generating a description file; and
   a second processing unit configured to access the advertisement that is created utilizing information in the description file, to dynamically place, in real-time as the video content is streaming to the second processing unit, the advertisement in a position on top of the video content based, in part, on the tracked locations and associated timestamps, and to animate the advertisement in synchronization with the video content, wherein animating the advertisement comprises starting or stopping play of the advertisement using the timestamps associated with the tracked locations.

* * * * *